United States Patent [19]

Yoshida et al.

[11] Patent Number: 5,282,451
[45] Date of Patent: Feb. 1, 1994

[54] ENGINE FUELED WITH MIXED FUEL AND OPERATION CONTROL METHOD THEREOF

[75] Inventors: Masato Yoshida, Kyoto; Muneyoshi Nanba, Okazaki; Kazumasa Iida; Katsuhiko Miyamoto, both of Kyoto, all of Japan

[73] Assignee: Mitsuishi Jidosha Kogyo Kabushiki Kaisha, Tokyo, Japan

[21] Appl. No.: 943,939

[22] Filed: Sep. 11, 1992

[30] Foreign Application Priority Data

Sep. 13, 1991 [JP] Japan .................................. 3-234992

[51] Int. Cl.⁵ .................................................. F02D 43/00
[52] U.S. Cl. ..................................... 123/406; 123/479
[58] Field of Search ............... 123/1 A, 406, 417, 479, 123/494

[56] References Cited

U.S. PATENT DOCUMENTS

| | | | |
|---|---|---|---|
| 4,986,241 | 1/1991 | Inoue et al. | 123/479 |
| 4,989,570 | 2/1991 | Kuribara et al. | 123/494 |
| 5,007,398 | 4/1991 | Kashiwabara | 123/494 X |
| 5,014,670 | 5/1991 | Mitsumoto | 123/494 X |
| 5,090,389 | 2/1992 | Oota | 123/494 X |
| 5,109,821 | 5/1992 | Yoshida et al. | 123/479 X |

*Primary Examiner*—Tony M. Argenbright
*Attorney, Agent, or Firm*—Abelman Frayne & Schwab

[57] ABSTRACT

In an operation control method of an engine using a mixed fuel of a mixture of a plurality of fuels having different properties, operation condition of the engine being controlled according to a detection signal from a fuel blend ratio detector for detecting the blend ratio of the plurality of fuels in the mixed fuel, and when a malfunction occurs in the detection by the fuel blend ratio detector, the engine is provided with blend ratio storage for storing a plurality of emergency blend ratios for ignition timing control and for air fuel ratio control, and operation condition of the engine is controlled according to the plurality of emergency blend ratios.

11 Claims, 6 Drawing Sheets

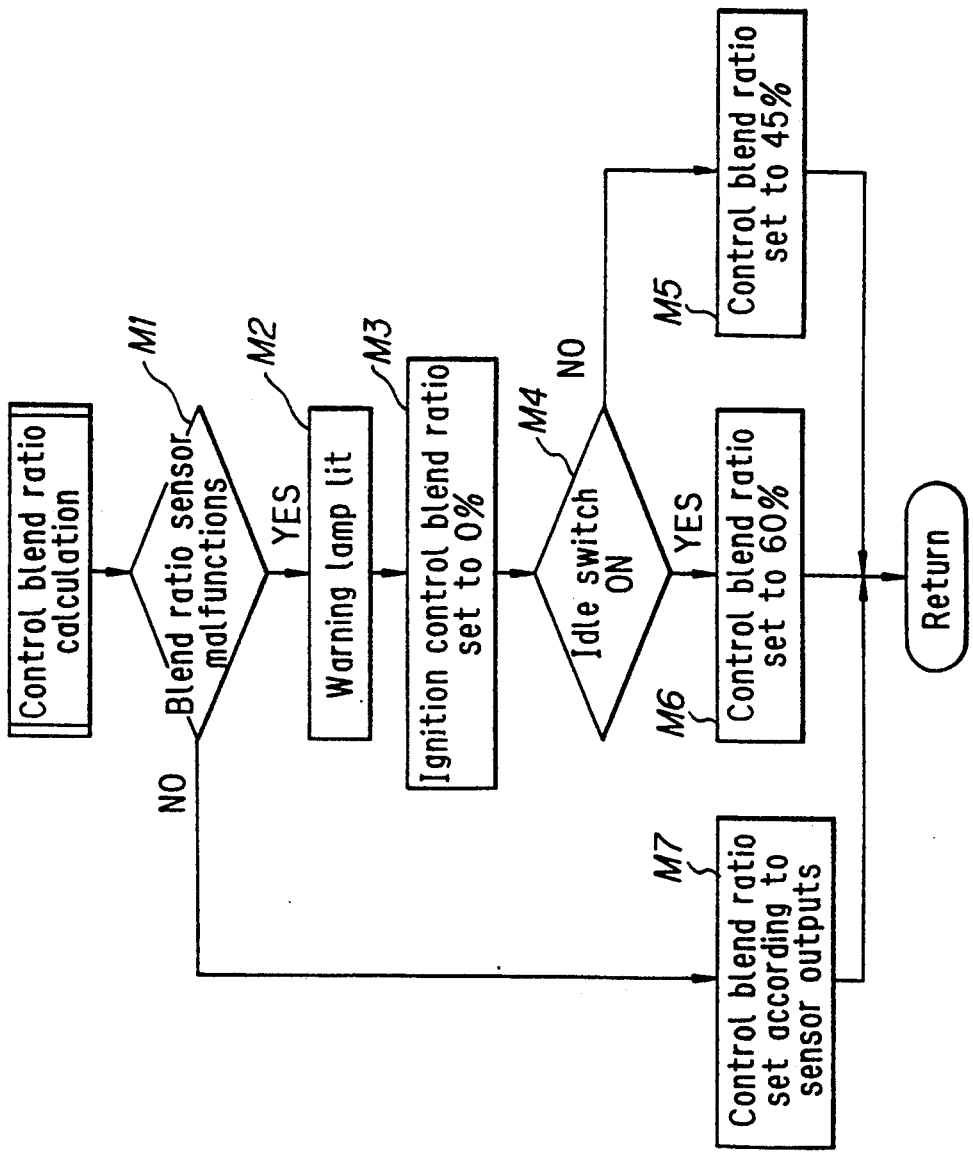

ENGINE FUELED WITH MIXED FUEL AND OPERATION CONTROL METHOD THEREOF

FIELD OF THE INVENTION

This invention relates to an internal combustion engine fueled with a mixed fuel based on a mixture of a plurality of fuels with different properties, specifically to one which enables continuous operation even when a malfunction occurs in detection by fuel blend ratio detection means for detecting the blend composition of the mixed fuel.

BACKGROUND OF THE INVENTION

An internal combustion engine using gasoline as a fuel which involves resource problems is able to use chemically producible methyl alcohol (hereinafter simply referred to as "alcohol"), as is, as a fuel by merely adjusting the combustion conditions such as ignition timing and air fuel ratio, without mechanical modification.

Use of alcohol, which has a possibility to have lower market prices than gasoline in other than oil producing countries, has the advantages that release of noxious substances in the exhaust gas can be remarkably reduced compared to the use of gasoline as a fuel. However, considering the current fuel supply system, use of a mixture of gasoline and alcohol as a mixed fuel would be more practicable than the use of alcohol alone as a fuel.

A vehicle equipped with an engine adaptable to such mixed fuel incorporates fuel blend ratio detection means in a fuel supply system of the vehicle for detecting a blend ratio of alcohol to gasoline, setting the ignition timing, air fuel ratio and the like according to the alcohol blend ratio supplied to the engine.

As the fuel blend ratio detection means, there are known a fuel blend ratio sensor, which detects the alcohol blend ratio of the mixed fuel by any method, and an $O_2$ sensor, which detects the oxygen concentration of exhaust gas to indirectly estimate the alcohol blend ratio of the mixed fuel.

Even if the engine is adaptable to the mixed fuel, it is necessary to detect the alcohol blend ratio of the mixed fuel and correct the ignition timing and air fuel ratio according to the detection results, not so far as the alcohol blend ratio of the mixed fuel is constant.

Therefore, when a malfunction occurs in the detection by the fuel blend ratio detection means, the engine tends to be in poor operation condition or undergo a stalling and, in the worst case, may be damaged due to occurrence of frequent knocking.

To prevent such a problem, when a malfunction occurs in the detection by the fuel blend ratio detection means, the engine must be immediately stopped operating and repaired. However, it is impossible to perform this during running of the vehicle, and any other counter-measures are required.

U.S. Pat. No. 4,986,241 proposes a method in which, when a malfunction occurs in detection of fuel blend ratio by blend ratio detection means, the fuel blend ratio is temporarily fixed to a predetermined emergency blend ratio, and operation condition of the engine is then detected to correct the emergency blend ratio. However, in this method, since feedback control to correct the emergency blend ratio is complicated, a high processing power, expensive calculation apparatus is required.

OBJECT OF THE INVENTION

With a view to eliminate the above prior art problems, it is a primary object of the present invention to provide a simple-structured engine fueled with a mixed fuel, which enables continuous operation of the engine without causing malfunction of the engine, even when a malfunction occurs in the detection of fuel blend ratio by blend ratio detection means.

Another object of the present invention is to provide an operation control method of an engine fueled with a mixed fuel, which enables continuous operation of the engine with no need for complex calculation processing even when a malfunction occurs in the detection of fuel blend ratio by blend ratio detection means.

SUMMARY OF THE INVENTION

In accordance with the present invention, as a first embodiment, in an engine fueled with a mixed fuel, which includes fuel blend ratio detection means for detecting a blend ratio of a mixture of a plurality of fuels having different properties, operation control means for controlling operation condition of the engine according to a detection signal from the fuel blend ratio detection means, and malfunction detection means for detecting a malfunction in the fuel blend ratio detection means, whereby, when a malfunction is detected by the malfunction detection means, the operation condition of the engine is controlled according to a predetermined emergency blend ratio, the engine comprises blend ratio storage means for storing a plurality of the emergency blend ratios.

As a second embodiment according to the present invention, in an engine fueled with a mixed fuel, which includes fuel blend ratio detection means for detecting a blend ratio of a mixture of a plurality of fuels having different properties, operation control means for controlling operation condition of the engine according to a detection signal from the blend ratio detection means, and malfunction detection means for detecting a malfunction in the fuel blend ratio detection means, whereby, when a malfunction is detected by the malfunction detection means, the operation condition of the engine is controlled according to a predetermined emergency blend ratio, the engine comprises blend ratio storage means for storing a plurality of emergency blend ratios for ignition timing control and air fuel ratio control, an idle switch for detecting idling condition of the engine, and blend ratio select means for selecting an optimum emergency blend ratio from the plurality of emergency blend ratios stored in the blend ratio storage means according to a detection signal from the idle switch.

There is also provided according to the present invention an operation control method of an engine which is fueled with a mixed fuel of a mixture of a plurality of fuels having different properties, the operation condition being controlled according to a detection signal from fuel blend ratio detection means for detecting the blend ratio of the plurality of fuels in the mixed fuel, and when a malfunction occurs in the detection by the fuel blend ratio detection means, operation condition of the engine being controlled according to a predetermined emergency blend ratio not causing a malfunction of the engine, characterized in that the operation condition of the engine is controlled according to a plurality of emergency blend ratios.

While detection of the blend ratio of a plurality of fuels in the mixed fuel is normally carried out by the fuel blend ratio detection means, the operation condition of the engine is controlled according to a detection signal from the fuel blend ratio detection means.

When a malfunction occurs in the detection by the fuel blend ratio detection means, the operation condition of the engine is controlled according to a plurality of predetermined emergency blend ratios which are previously set so as not to cause a malfunction of the engine.

The plurality of emergency blend ratios include a blend ratio for ignition timing control and a blend ratio for air fuel ratio control.

Since, when a malfunction occurs in the detection by the fuel blend ratio detection means, the operation condition of the engine is controlled according to predetermined ignition timing control blend ratio and air fuel ratio control blend ratio, the engine can continue operation without causing a malfunction. Furthermore, there is no need to provide any new mechanical device, nor for complex feedback control, and the present invention can be achieved by simply changing software. Therefore, the present invention is advantageous in view of cost, since it does not require an expensive calculation unit.

BRIEF DESCRIPTION OF THE DRAWINGS

FIG. 7 is a flow chart showing a subroutine for calculating the controlled blend ratio.

DETAILED DESCRIPTION OF THE PREFERRED EMBODIMENT

Figure 1:
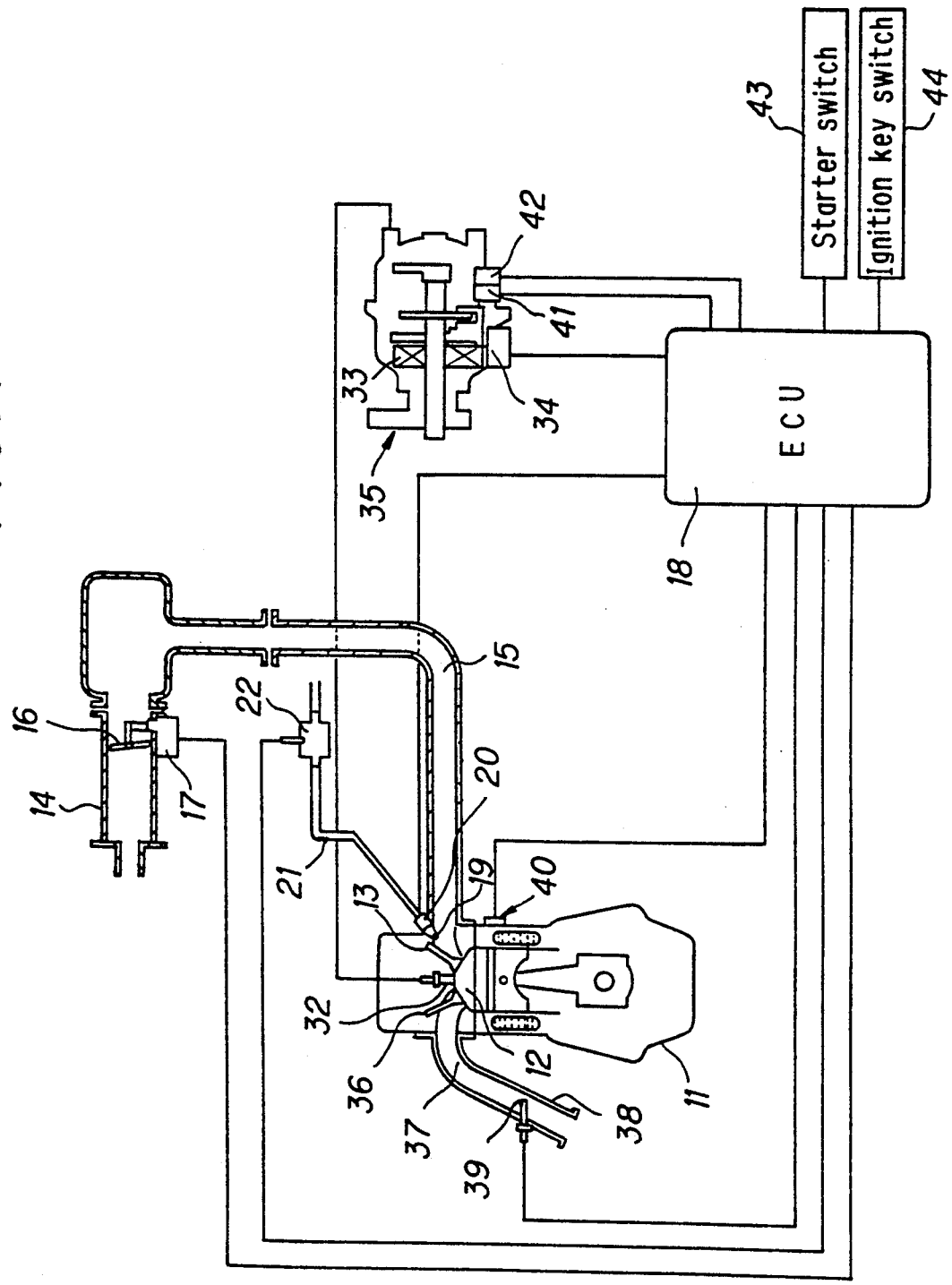
FIG. 1 is a schematic view showing structure of an embodiment of a vehicle equipped with a four-cylinder internal combustion engine to which the present invention can be applied.

FIG. 1 is a schematic view showing structure of an embodiment in which the engine fueled with a mixed fuel and the operation control method thereof according to the present invention are applied to a vehicle equipped with a four-cylinder internal combustion engine using a mixed fuel of gasoline and alcohol.

Referring to FIG. 1, an intake pipe 14, of which the base side communicates with a combustion chamber 12 of an engine 11 through an intake valve 13, is mounted halfway with a throttle valve 16, which varies an opening of a intake passage 15 formed in the intake pipe 14 in cooperation with the movement of an accelerator pedal (not shown) to adjust an intake air amount A supplied into the combustion chamber 12. The throttle valve 16 is provided with an idle switch 17 which detects a full-close condition of the throttle valve 16 to determine an idle condition the engine 11. The idle switch 17 is connected with an electronic control unit (hereinafter referred to as "ECU") which receives a detection signal outputted from the idle switch 17.

At the downstream end side of the intake passage 15, a fuel injection nozzle 19 of a fuel injection device to inject fuel (not shown) into the combustion chamber 12 of the engine 11. Fuel is injected from the fuel injection nozzle 19 into the combustion chamber 12 through an electromagnetic valve 20 which is duty controlled by ECU 16. Thus, valve opening time of the electromagnetic valve 20 is controlled so that fuel of an amount according to the intake air amount A is supplied to the combustion chamber 12, thereby setting the combustion chamber 12 to a predetermined air fuel ratio.

A fuel blend ratio sensor 22 is mounted halfway to a fuel supply tube 21 to supply fuel to the fuel injection nozzle 19. A detection signal from the fuel blend ratio sensor 22 is outputted to ECU 18.

Figure 2:
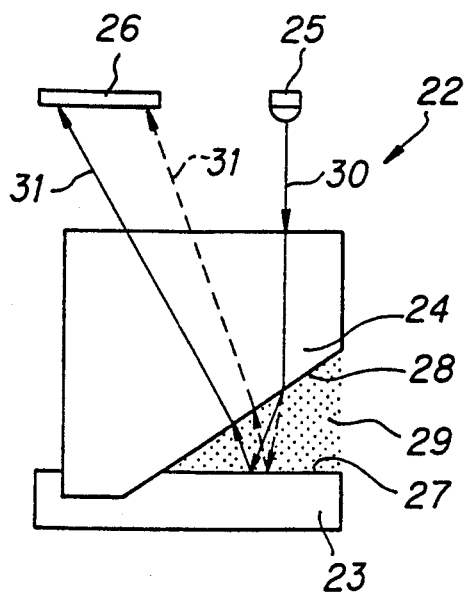
FIG. 2 is a schematic view showing structure of a fuel blend ratio sensor.

FIG. 2 is a schematic view showing structure of the fuel blend ratio sensor 22 used in this embodiment.

The fuel blend ratio sensor 22 of this embodiment comprises a reflector mirror 23, a transmission prism 24, a light source 25, and a position detection device 28. By positioning a sloped surface 28 of the transmission prism 24 to be inclined relative to a reflection surface 27 of the reflector mirror 23, a wedge-formed space 29 to be supplied with a fuel to be measured is formed. With an eye on the fact that, with a light beam 30 from the light source 25, which is a light-emitting diode or the like, projected towards the wedge-formed space 29, the refractive index of the fuel to be measured varies with the blend ratio of methyl alcohol (refractive index increasing with increasing blend ratio), the position of reflected light 31 is detected by the position detection device 26.

For example, in FIG. 2, the reflected light 31 of the broken line representing a case where the blend ratio of the fuel to be measured is 0% and the reflected light 31 of the solid line representing a case where the blend ratio is 85% differ in the position of reflected light 31 relative to the position detection device 26, the blend ratio of the fuel to be measured is detected according to the difference.

The fuel injection nozzle 19 of this embodiment is of a type having four units of nozzles provided in an intake manifold of the intake passage 15 according to the number of cylinders of the engine 11, that is, of a multi-point type.

An ignition plug 32 in the combustion chamber 12 of the engine 11 is connected to a distributor 35 incorporating an ignition coil 33 and a power transistor 34. An OFF operation of the power transistor 34 generates a high voltage in the ignition coil 33 which causes the ignition plug 32 to make a spark discharge, and an ON operation of the power transistor 34 causes the ignition coil 33 to start charging.

An $O_2$ senor 39 for detecting an oxygen concentration of exhaust gas is disposed halfway in an exhaust pipe 38 formed with an exhaust passage 37 of which the base side communicates with the combustion chamber 12 of the engine 11 through an exhaust valve 36. The $O_2$ sensor 39 is connected to ECU 18 which receives a detection signal outputted from the $O_2$ sensor.

Therefore, in a normal operation condition of the engine 11, air taken in the intake passage 15 according to the opening of the throttle valve 18 is mixed with fuel injected from the fuel injection nozzle 19 according to the detection signal from the $O_2$ sensor so that an adequate air fuel ratio is achieved. The air mixture is ignited by the ignition plug 32 in the combustion chamber 12 to burn into exhaust gas which is discharged from the exhaust passage 37.

To maintain the engine 11 in a good operation condition, this Embodiment uses various sensors, and the ignition timing of the ignition plug 32, the fuel injection amount from the fuel injection nozzle 19 and the like are controlled according to detection signals from these sensors. Specifically, in addition to the idle switch 17, the fuel blend ratio sensor 22, and the $O_2$ sensor which are described above, the engine 11 is provided with a knock sensor 40 for detecting the presence of knocking according to vibrations of the cylinder block. In addition, there are incorporated in the distributor 35 a top dead center sensor (hereinafter referred to as "TDC sensor") 41 for detecting the compression top dead center position in the first cylinder, which is predetermined among from the four cylinders, and a crank angle position sensor 42 for detecting a crank angle phase with respect to the compression top dead center position in the first cylinder.

These sensors 17, 22, 39 to 42 are connected to ECU 18 which receives detection signals outputted from these sensors, and ECU 18 is further connected with a starter switch 43 for starting an engine starter motor (not shown) and an ignition key switch 44.

When the above-described various sensors 17, 22, 39 to 42 are normally functioning, the operation condition of the engine 11 can be controlled according to detection signals from these sensors. However, when the alcohol ratio of the mixed fuel becomes impossible to be detected for any reason, it is necessary to control the operation condition of the engine 11 at a value not causing a malfunction of the engine 11.

Figure 3:
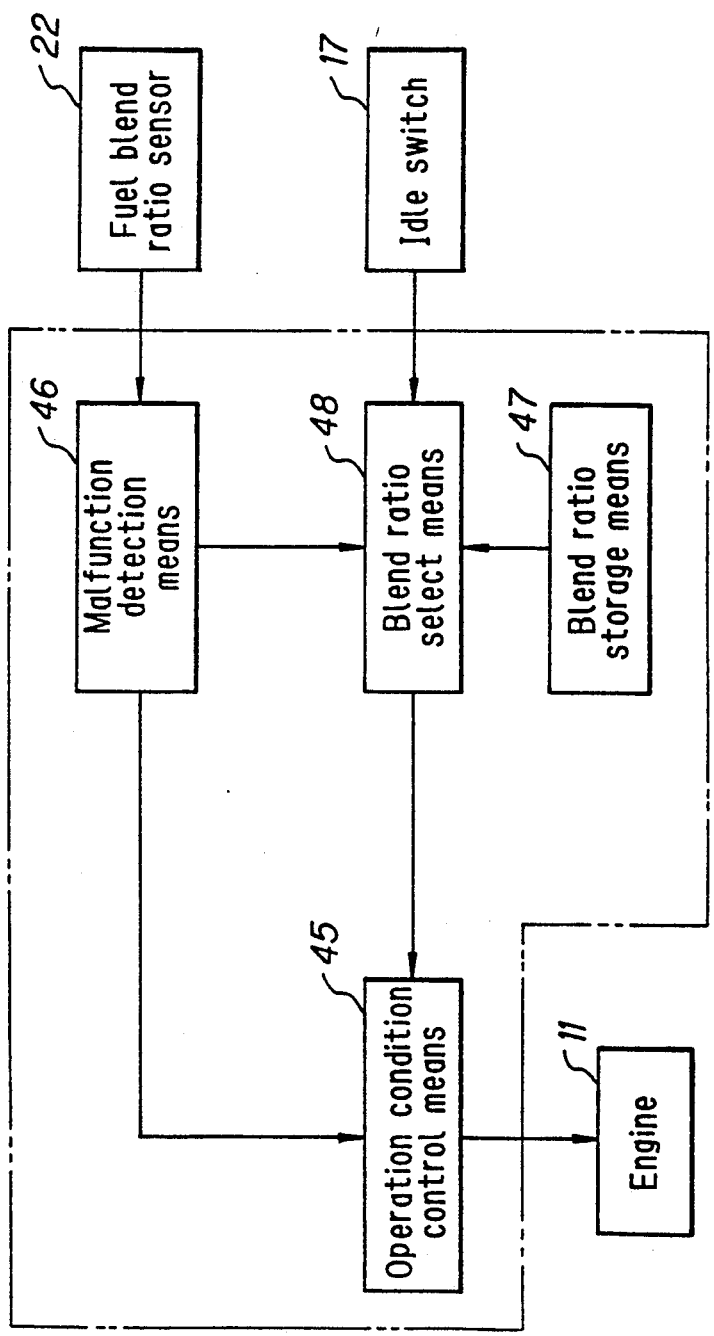
FIG. 3 is a control block diagram of the embodiment.

FIG. 3 is a control block diagram of this embodiment. ECU 18 incorporates operation condition control means 45 for controlling operation condition of the engine 11, malfunction detection means 46 for detecting a malfunction such that alcohol ratio in the mixed fuel cannot be detected by the fuel blend ratio sensor 22, blend ratio storage means 47 for storing emergency blend ratios for ignition timing control and air fuel ratio control not causing a malfunction of the engine 11 when a malfunction is detected by the malfunction detection means 46, and blend ratio select means 48 for selecting an optimum blend ratio from the plurality of air fuel ratio control blend ratios stored in the blend ratio storage means 47 according to a detection signal from the idle switch 17, whereby, when a malfunction is detected by the malfunction detection means 46, operation condition of the engine 11 is controlled according to the emergency blend ratio selected by the blend ratio select means 48.

In this embodiment, the air fuel ratio control blend ratios stored in the blend ratio storage means 47 include one which is set for an idling condition of the engine 11 and one which is set for others. Detailed structure of the malfunction detection means 46 is a technology which is already known through U.S. Pat. No. 4,988,241 and others, and is not specifically described here.

Figure 4:
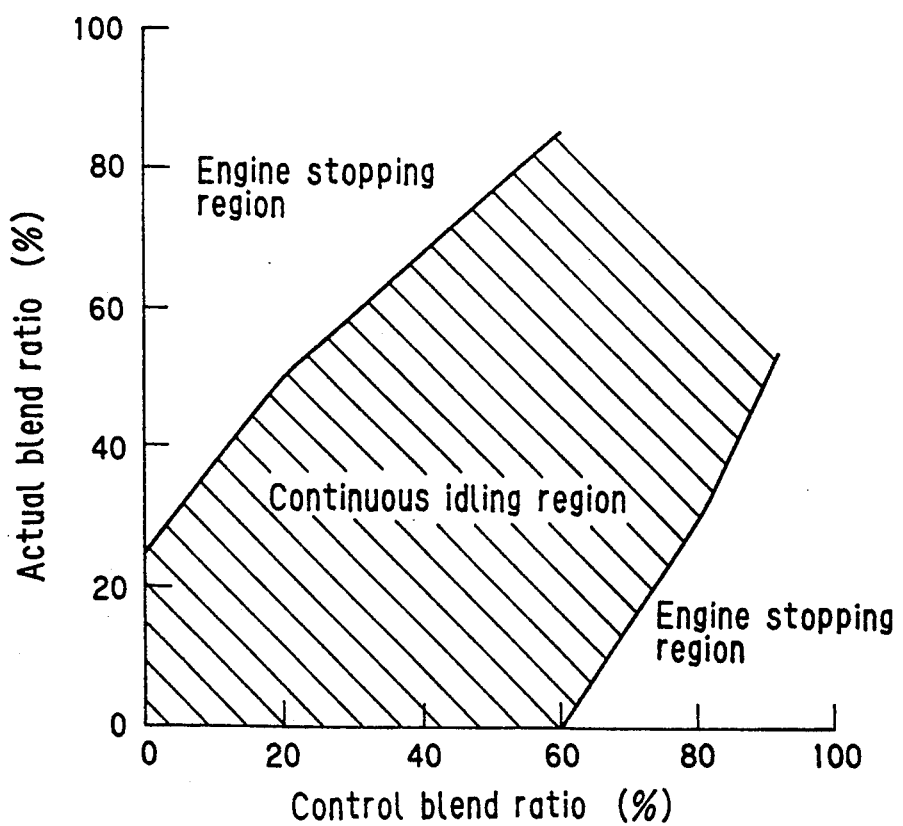
FIG. 4 is a graph showing idling operation conditions of an engine according to a difference between a controlled blend ratio and an actual blend ratio of the fuel.

In an idling condition of the engine 11, operation condition of the engine 11 when an actual alcohol ratio (hereinafter referred to as "actual blend ratio) of the mixed fuel supplied to the engine 11 differs from an alcohol ratio of the mixed fuel set by ECU 18 (hereinafter referred to as "control blend ratio) is shown in FIG. 4.

It can be seen from FIG. 4 that, for example, with the control blend ratio set to 20%, the engine 11 tends to stall when the actual blend ratio exceeds 50% and, with the control blend ratio set to 80%, the engine 11 stalls when the actual blend ratio is less than 30%.

Therefore, it can be determined from FIG. 4 that, since mixed fuel containing more than 85% of alcohol is not present in the current market, in order to always operate the engine 11 independent of the actual blend ratio, the control blend ratio may be set to 60%.

Figure 5:
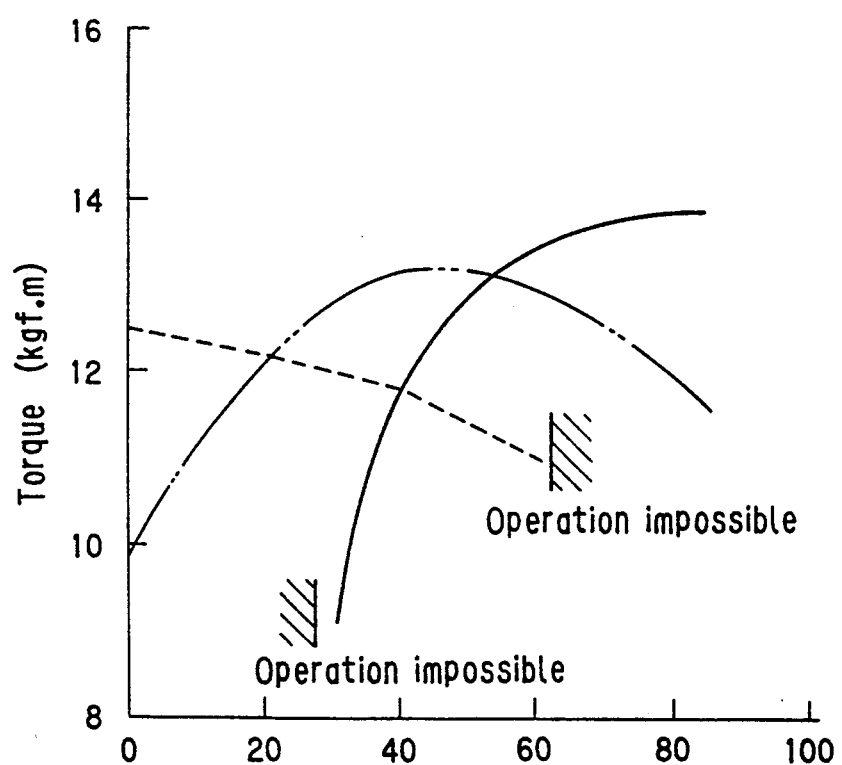
FIG. 5 is a graph showing the relationship between the controlled blend ratio of the fuel and a driving torque of the engine with a throttle valve fully opened, relative to the actual blend ratio.

FIG. 5 shows changes in driving torque of the engine 11 when, with the throttle valve 16 maintained at a full-open position, the actual blend ratio of mixed fuel supplied to the engine 11 differs from the control blend ratio of mixed fuel set by ECU 18.

For example, for an actual blend ratio of 0% as indicated by the broken line, the engine 11 becomes unoperatable if the control blend ratio is set to more than 60%. Furthermore, for an actual blend ratio of 85% as indicated by the solid line, the engine 11 becomes unoperatable if the control blend ratio is set to less than 30%. However, for an actual blend ratio of 45% as indicated by the two-dot-bar line, the engine 11 can maintain operation even with any value of the control blend ratio.

Therefore, as can be seen from FIG. 5, except for an idling condition of the engine, the engine 11 can maintain operation with any value of actual blend ratio, when the control blend ratio is set to between 30% and 60%, preferably 40% to 45% (45% for this Embodiment).

As to the ignition timing, since the smaller the ratio of alcohol which is highly anti-knocking, the more knocking is liable to generate, it is desirable that the control blend ratio be set to 0% and the ignition timing set to the most retarded side.

Figure 6:
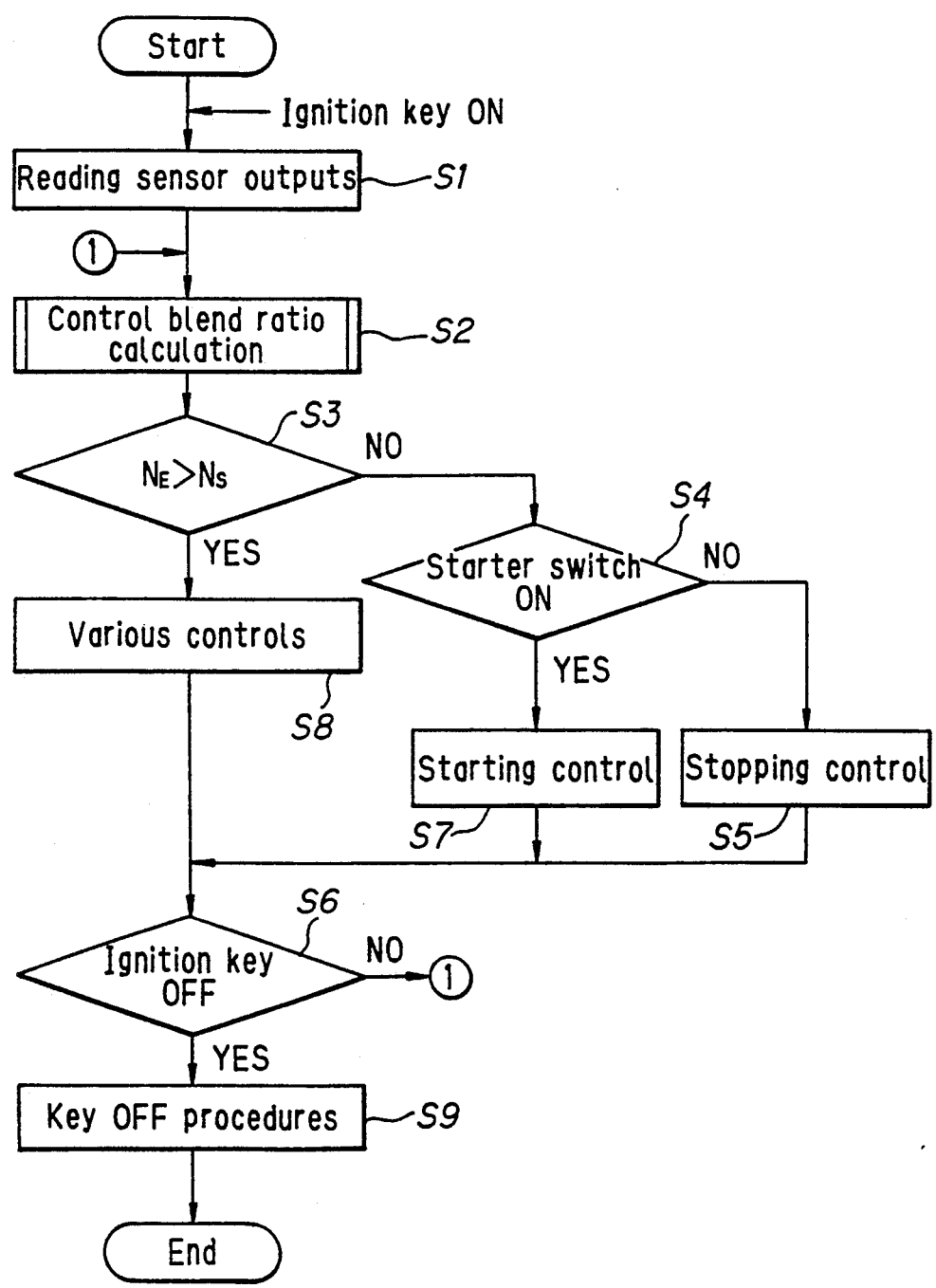
FIG. 6 is a flow chart showing control procedure of the present invention.

Based on the above-described findings, flow of operation control method in this Embodiment is shown in FIG. 6.

Specifically, when the ignition key switch 44 is turned on, ECU 18 in step S1 reads outputs from the sensors 17, 22, and 39-42. And, the control blend ratio is calculated in step S2.

This control blend ratio subroutine is shown in FIG. 7.

Specifically, in step M1, determination is made by the malfunction detection means 46 as to whether or not the fuel blend ratio sensor 22 is out of order. When it is determined by the malfunction detection means 46 in step M1 that the fuel blend ratio sensor 22 is out of order, a warning lamp (not shown) provided in the vehicle room is lit in step M2. Furthermore, in step M3, the blend ratio select means 48 sets the control blend ratio for ignition timing control to 0%, setting the ignition timing to the most retarded side where knocking generation can be positively prevented. After that, in step M4, determination is made by the blend ratio select means 48 as to whether or not the idle switch 43 is set on.

When it is determined by the blend ratio select means 48 in step M4 that the idle switch 43 is not on, that is, the engine 11 is determined to be not in an idling condition, the blend ratio select means 48 sets the control blend ratio of mixed fuel to 45% in step M5, thereby positively preventing occurrence of a malfunction such that the engine 11 becomes unoperatable during traveling. After that, ECU 18 determines in step S3 shown in FIG. 6 whether or not an engine speed $N_E$ is greater than a predetermined engine starting speed (for example, 200-300 rpm) $N_S$, according to the detection signal from the crank angle position sensor 42.

On the other hand, when it is determined by the blend ratio select means 48 in step M4 that the idle switch 43 is on, that is, the engine 11 is in an idling condition, the blend ratio select means 48 sets the control blend ratio of mixed fuel to 60% in step M6, thereby enabling the engine 11 to positively continue idling.

When, in step M1, the fuel blend ratio sensor 22 is determined by the malfunction detection means 46 to be normally functioning, the control blend ration is set in step M7 according to the detection signal from the fuel blend ratio sensor 22. And, operation condition of the engine 11 is all controlled according to the control blend ratio.

When it is determined in step S3 that the engine speed $N_E$ is lower than the engine starting speed $N_S$, that is, the engine 11 is not in a normal operation condition, determination is made in step S4 as to whether or not the starter switch 43 is on.

When it is determined in step S4 that the starter switch 43 is off, that is, the engine 11 is in a standstill condition, in step S5, various processings for engine stoppage are performed, such as lighting a warning lamp (not shown) to inform engine stoppage or stopping fuel supply or the ignition signal. Then, determination is made in step S6 whether or not the ignition key switch 44 is off.

When it is determined in step S4 that the starter switch 43 is on, that is, the engine 11 is starting, in step S7, engine starting control is made including supplying engine starting fuel and making engine starting ignition and the like, and the processing goes to step S6.

On the other hand, when it is determined in step S3 that the engine speed $N_E$ exceeds the engine starting speed $N_S$, that is, the engine 11 is at least in an idling operation, various controls to continue operation of the engine 11 are performed in step S8, and the processing goes to step S6.

When it is determined in step S6 that the ignition key switch 44 is off, that is, the engine 11 is in a standstill condition, various control procedures for key OFF are performed accordingly for storing various values and the like learned during the operation of the engine 11 in a RAM (not shown) or the like accordingly. However, when the ignition key switch 44 is on in step S6, the processing returns to step S2 where the control blend ratio is calculated.

What is claimed is:

1. In an engine fueled with a mixed fuel including fuel blend ratio detection means for detecting a blend ratio of a mixture of a plurality of fuels having different properties, operation control means for controlling operation condition of the engine according to a detection signal from said fuel blend ratio detection means, and malfunction detection means for detecting a malfunction in said fuel blend ratio detection means, whereby, when a malfunction is detected by said malfunction detection means, operation condition of the engine is controlled according to a predetermined emergency blend ratio, the engine comprises blend ratio storage means for storing a plurality of emergency blend ratios.

2. The engine fueled with a mixed fuel of claim 1 wherein said emergency blend ratios are a blend ratio for ignition timing control and a blend ratio for air fuel ratio control.

3. The engine fueled with a mixed fuel of claim 2 wherein the mixed fuel comprises gasoline and alcohol.

4. The engine fueled with a mixed fuel of claim 3 wherein the emergency blend ratio for ignition timing control is 100% gasoline and 0% alcohol.

5. In an engine fueled with a mixed fuel including fuel blend ratio detection means for detecting a blend ratio of a mixture of a plurality of fuels having different properties, operation control means for controlling operation condition of the engine according to a detection signal from said fuel blend ratio detection means, and malfunction detection means for detecting a malfunction in said fuel blend ratio detection means, whereby, when a malfunction is detected by said malfunction detection means, operation condition of the engine is controlled according to a predetermined emergency blend ratio, the engine comprises blend ratio storage means for storing a plurality of emergency blend ratios for ignition timing control and air fuel ratio control, an idle switch for detecting idling condition of the engine, and blend ratio select means for selecting an optimum emergency blend ratio from the plurality of emergency blend ratios stored in said blend ratio storage means according to a detection signal from the idle switch.

6. The engine fueled with a mixed fuel of claim 5 wherein the mixed fuel comprises gasoline and alcohol.

7. The engine fueled with a mixed fuel of claim 6 wherein the emergency blend ratio for ignition timing control is 100% gasoline and 0% alcohol.

8. The engine fueled with a mixed fuel of claim 6 wherein the emergency blend ratio for air fuel ratio control is 40% gasoline and 60% alcohol for an idling condition of the engine, and 55% gasoline and 45% alcohol for cases other than idling condition of the engine.

9. A method of controlling an engine fueled with a mixture of a plurality of fuels having different properties, including the steps of:
controlling the engine in accordance with a detection signal from a fuel blend ratio detection means operative to detect the blend ratio of a plurality of fuels present in said fuel mixture; and,
when a malfunction occurs in said fuel blend ratio detection means, then, controlling the engine in accordance with a predetermined emergency blend ratio operative to continue functioning of the engine,
in which the emergency blend ratio is selected from a plurality of predetermined emergency blend ratios according to a desired engine condition,
the mixed fuel comprises gasoline and alcohol, and
the emergency blend ratio for ignition timing control is 100% gasoline and 0% alcohol.

10. The engine fueled with a mixed fuel of claim 9 wherein the emergency blend ratio for air fuel ratio control differs between that for an idling condition of the engine and for other cases.

11. The engine fueled with a mixed fuel of claim 10 wherein the emergency blend ratio for air fuel ratio control is 40% gasoline and 60% alcohol for an idling condition of the engine, and 55% gasoline and 45% alcohol for cases other than idling condition of the engine.

* * * * *